United States Patent
Zhang et al.

(10) Patent No.: US 9,769,763 B2
(45) Date of Patent: Sep. 19, 2017

(54) NODES AND METHOD FOR POWER CONTROL

(75) Inventors: Zhang Zhang, Beijing (CN); Mats Blomgren, Stockholm (SE); Muhammad Kazmi, Bromma (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 52 days.

(21) Appl. No.: 14/113,036

(22) PCT Filed: Apr. 26, 2011

(86) PCT No.: PCT/SE2011/050499
§ 371 (c)(1),
(2), (4) Date: Oct. 21, 2013

(87) PCT Pub. No.: WO2012/148322
PCT Pub. Date: Nov. 1, 2012

(65) Prior Publication Data
US 2014/0036857 A1    Feb. 6, 2014

(51) Int. Cl.
*H04W 52/24* (2009.01)
*H04W 52/08* (2009.01)
(Continued)

(52) U.S. Cl.
CPC ............ *H04W 52/24* (2013.01); *H04W 52/08* (2013.01); *H04W 52/241* (2013.01);
(Continued)

(58) Field of Classification Search
CPC ............................. H04W 52/24; H04W 52/146
(Continued)

(56) References Cited

U.S. PATENT DOCUMENTS

| | | | |
|---|---|---|---|
| 6,085,107 A | 7/2000 | Persson et al. | |
| 6,085,108 A * | 7/2000 | Knutsson | H04B 7/022 |
| | | | 455/522 |

(Continued)

FOREIGN PATENT DOCUMENTS

| | | |
|---|---|---|
| WO | 0199303 A2 | 12/2001 |
| WO | 2005032010 A1 | 4/2005 |
| WO | 2010120219 A1 | 10/2010 |

OTHER PUBLICATIONS

Feng, Sujuan et al., "Self-Organizing Networks (SON) in 3GPP Long Term Evolution," May 20, 2008, pp. 1-15, Nomor Research GmbH, Munich, Germany.

(Continued)

*Primary Examiner* — Parth Patel
(74) *Attorney, Agent, or Firm* — Patents on Demand P.A.; Brian K. Buchheit; Scott M. Garrett

(57) ABSTRACT

A controlling node (210) for UEs (115) in a cell in a communications system (200), arranged to generate (255) and transmit (230, 235) control commands to the UEs regarding their output power level, and to generate those control commands using either at least a first or a second power control scheme. In embodiments, the first power control scheme is a signal quality based power control scheme and the second power control scheme is a signal strength based power control scheme. In embodiments, the controlling node (210) is arranged to receive (230, 240) from a network controlling node (205) information regarding the capabilities of at least one other controlling node (220) in the cellular communications system (200) with respect to which power control scheme or schemes that the other controlling node (220) is arranged to use.

10 Claims, 11 Drawing Sheets

(51) Int. Cl.
- *H04W 52/38* (2009.01)
- *H04W 88/08* (2009.01)
- *H04W 88/12* (2009.01)
- *H04W 52/26* (2009.01)
- *H04W 52/40* (2009.01)

(52) U.S. Cl.
CPC ......... *H04W 52/245* (2013.01); *H04W 52/26* (2013.01); *H04W 52/386* (2013.01); *H04W 52/40* (2013.01); *H04W 88/08* (2013.01); *H04W 88/12* (2013.01)

(58) Field of Classification Search
USPC ....... 370/329, 318, 278, 328, 342, 235, 311, 370/315, 316; 455/522, 69, 436, 67.11, 455/70, 127.1, 127.2, 434
See application file for complete search history.

(56) References Cited

U.S. PATENT DOCUMENTS

| | | | | |
|---|---|---|---|---|
| 6,334,047 | B1* | 12/2001 | Andersson | H04W 52/04 455/436 |
| 6,718,180 | B1* | 4/2004 | Lundh et al. | 455/522 |
| 8,706,152 | B2* | 4/2014 | Seo et al. | 455/522 |
| 8,744,510 | B2* | 6/2014 | Dayal et al. | 455/522 |
| 2002/0012326 | A1* | 1/2002 | Chang | 370/318 |
| 2002/0080719 | A1* | 6/2002 | Parkvall et al. | 370/235 |
| 2002/0086693 | A1* | 7/2002 | Ahmad et al. | 455/522 |
| 2002/0115460 | A1* | 8/2002 | Rune | H04W 52/40 455/522 |
| 2002/0115465 | A1* | 8/2002 | Komatsu | 455/522 |
| 2002/0187784 | A1* | 12/2002 | Tigerstedt et al. | 455/439 |
| 2003/0021243 | A1* | 1/2003 | Hamalainen | 370/329 |
| 2003/0081572 | A1* | 5/2003 | Kim et al. | 370/332 |
| 2003/0092459 | A1* | 5/2003 | Blessent | 455/522 |
| 2003/0099209 | A1* | 5/2003 | Laakso et al. | 370/311 |
| 2003/0142632 | A1* | 7/2003 | Lin et al. | 370/252 |
| 2003/0171123 | A1* | 9/2003 | Laakso et al. | 455/453 |
| 2003/0185159 | A1* | 10/2003 | Seo et al. | 370/278 |
| 2004/0022213 | A1* | 2/2004 | Choi et al. | 370/332 |
| 2004/0106423 | A1* | 6/2004 | McGowan et al. | 455/522 |
| 2004/0110473 | A1* | 6/2004 | Rudolf et al. | 455/69 |
| 2004/0131026 | A1* | 7/2004 | Kim et al. | 370/328 |
| 2005/0014523 | A1* | 1/2005 | Pi et al. | 455/522 |
| 2005/0208973 | A1* | 9/2005 | Iochi | 455/561 |
| 2005/0282574 | A1* | 12/2005 | Li et al. | 455/522 |
| 2006/0019665 | A1* | 1/2006 | Aghvami et al. | 455/444 |
| 2006/0040619 | A1* | 2/2006 | Cho | H04W 52/08 455/69 |
| 2006/0240826 | A1* | 10/2006 | Shinozaki | 455/436 |
| 2006/0246935 | A1* | 11/2006 | Iochi | H04W 52/346 455/522 |
| 2006/0246937 | A1* | 11/2006 | Lindoff | 455/522 |
| 2007/0149201 | A1 | 6/2007 | Dominique et al. | |
| 2007/0217348 | A1* | 9/2007 | Tapia Moreno et al. | 370/278 |
| 2007/0281728 | A1* | 12/2007 | Charriere et al. | 455/522 |
| 2008/0039128 | A1* | 2/2008 | Ostman et al. | 455/522 |
| 2008/0077837 | A1* | 3/2008 | Lohr et al. | 714/748 |
| 2008/0188260 | A1* | 8/2008 | Xiao | H04W 52/146 455/522 |
| 2008/0261645 | A1* | 10/2008 | Luo et al. | 455/522 |
| 2009/0010229 | A1* | 1/2009 | Kazmi | H04W 52/243 370/336 |
| 2009/0093281 | A1* | 4/2009 | Demirhan et al. | 455/574 |
| 2009/0325625 | A1* | 12/2009 | Hugl et al. | 455/522 |
| 2010/0074227 | A1* | 3/2010 | Boncz et al. | 370/331 |
| 2010/0118784 | A1* | 5/2010 | Goransson et al. | 370/328 |
| 2010/0165845 | A1* | 7/2010 | Lott et al. | 370/235 |
| 2010/0216486 | A1* | 8/2010 | Kwon et al. | 455/452.2 |
| 2010/0227638 | A1* | 9/2010 | Park et al. | 455/522 |
| 2010/0317385 | A1* | 12/2010 | Kazmi et al. | 455/501 |
| 2011/0053631 | A1 | 3/2011 | Bottomley et al. | |
| 2011/0096677 | A1* | 4/2011 | Kim | 370/252 |
| 2011/0128930 | A1* | 6/2011 | Furuskar | H04L 1/0003 370/329 |
| 2012/0140690 | A1* | 6/2012 | Choi et al. | 370/311 |

OTHER PUBLICATIONS

Yang, Yu-Jun et al., "A Strength-and-SIR-Combined Adaptive Power Control for CDMA Mobile Radio Channels," Nov. 1999, pp. 1-9. IEEE Transactionc on Vehicular Technology. vol. 48, No. 6.

\* cited by examiner

NODES AND METHOD FOR POWER CONTROL

TECHNICAL FIELD

The present invention discloses nodes and methods for improved power control in a cellular communications system.

BACKGROUND

In a cellular communications system such as, for example, a CDMA system, there is a need and a desire to frequently adjust the output power used by the User Equipments, UEs, in a cell, in order to achieve a balance between the quality of the signals and the interference in the cell. This frequent power control of the UEs in a cell is usually referred to as the inner loop power control. The power control of the UEs in a cell is also interchangeably referred to as the "uplink power control" or even "reverse link power control".

The inner loop power control is performed by the controlling node of the cell, sometimes generically referred to as the "base station" of the cell, which transmits power control commands to the UEs in the cell in order to adjust the output power level of the UEs in the cell so that an estimated quality measure at the base station meets a quality target.

A NodeB in a CDMA system receives configuration commands for the power control from a Radio Network Controller, an RNC, in the system.

SUMMARY

It is a purpose of the present invention to provide improved nodes and methods for power control in a cellular communications system.

This purpose is addressed by the present invention in that it discloses a controlling node for User Equipments, UEs, in a cell in a cellular communications system. The controlling node is arranged to generate and transmit control commands to the UEs in the cell to control their output power level. In addition, the controlling node is arranged to generate the control commands using either at least a first or a second power control scheme.

Since the controlling node is arranged to generate the control commands using either at least a first or a second power control scheme, it is easier to adapt to the demands of different situations, i.e. by means of changing to a power control scheme which is the most appropriate at any given moment. Naturally, more than two different power control schemes can also be used by the controlling node.

Typically, the power control commands have two levels, i.e. UP or DOWN. The controlling node sends UP commands when the estimated quality is lower than the target, and DOWN commands when the estimated quality is equal to or above the target. The power control command can also be tri-level i.e. UP, DOWN and HOLD (i.e. No Change). For example, if the estimated quality is within certain level, the controlling node doesn't send either UP or DOWN commands. The invention is applicable to any power control schemes in terms of number of levels used for controlling the UE output power.

In embodiments, the first power control scheme is a signal quality based power control scheme, and the second power control scheme is a signal strength based power control scheme.

In embodiments, the controlling node is arranged to receive from a network controlling node information regarding the capabilities of at least one other controlling node in the cellular communications system with respect to which power control scheme or schemes that the other controlling node is arranged to use.

In embodiments, the controlling node is arranged to transmit to the network controlling node information regarding which the power control schemes are that it, i.e. the controlling node, is arranged to use.

In embodiments, the controlling node is arranged to receive a command from the network controlling node regarding which of said at least two different power control schemes that the controlling node should use in generating said control commands to a certain UE.

In embodiments, the controlling node is arranged to transmit information to the network controlling node for use in the network controlling node's selection of which of said at least two different power control schemes that should be used by the controlling node for a certain UE, the information including one or more of:
Target received signal level in the cell of the UE,
Assigned resources in the cell of the UE,
The radio environment for the UE in question.

An example of a metric which expresses a target received signal level in the cell of the UE is a target RoT, Rise over Thermal, in the cell of the UE. Examples of assigned resources in the cell comprise Grants or E-TFC, Enhanced Transport Format Compilation, in the cell of the UE.

The first two of the three parameters above, target received signal level and assigned resources in the cell of the UE, enable the controlling node to determine if there are high data rate UEs present in the cell of the UE in question: if there are no such UEs in the cell, then the controlling node can conclude that the UE in question can obviously not be one either. Conversely, if one or both of these factors prove "positive", a further investigation can be made to see if the UE in question is a high data rate UE, and if they both prove negative, no such investigation is necessary in order to conclude that the UE is not a high data rate UE. The identity of the UE as a high data rate UE or not can then be used in the choice of power control scheme.

With respect to the target received signal level, the identity of the UE as a high data rate UE can be determined as follows: a low RoT (as compared to a target RoT) in the cell indicates that there are no high data rate UEs in the cell, and conversely, a high RoT in the cell indicates the presence of at least one high data rate UE, which might be the UE in question, thus warranting further investigation.

The radio environment of the UE is suitably expressed as the Doppler shift and/or the delay spread and/or the angular spread in the signals from the UE to the controlling node.

In embodiments, the controlling node is arranged to decide which of its power control schemes to use for a certain UE, and to transmit information on its decision to the network controlling node.

In embodiments, the controlling node is arranged to use the information regarding the capabilities of the least one other controlling node in its selection of power control scheme.

The invention also discloses a network controlling node for a cellular communications system. The network controlling node is arranged to generate and transmit to controlling nodes of cells in the cellular communications system one or more configuration commands for the generation of power control commands to User Equipments, UEs.

The network controlling node is arranged to receive from at least one controlling node information regarding different power control schemes that the controlling node is arranged to use in the generation of power control commands, and to generate and send a command to the controlling node regarding which of the different power control schemes that the controlling node should use for a certain UE.

In embodiments, the network controlling node is arranged to receive from a controlling node one or more of the following parameters in a certain cell which is controlled by the controlling node:

A target received signal level in the cell,
Assigned resources in the cell,
These two parameters have been exemplified above, where it has also been explained how these two parameters can be used in order to determine if a UE in the cell in question can be a high data rate UE or not.
The radio environment characteristics of the UE in question, which, as explained above, can, for example, be expressed as the Doppler shift and/or the delay spread and/or the angular spread in the signals from the UE to the controlling node.

In addition, the received signal level variation in the signals from the UE can be added to the parameters received from the controlling node.

In embodiments, the network controlling node is arranged to base its command to the controlling node on one or more of the following per UE:

The controlling node's power control command schemes,
Call or session state, e.g. whether latency is critical or not,
QoS,
Target received signal level in the cell of the UE,
Assigned resources Grant in the cell of the UE,
Packet size or data block size or File size etc,
Uplink receiver type,
Radio environment characteristics of the UE.

In embodiments, the parameter "Received signal level variation" e.g. RoT variation in the cell of the UE, can be added to the above parameters Regarding the parameter QoS, this is suitably expressed as target delay, BLER, etc., or the type of call, such as emergency or normal.

Regarding the parameters "target received signal level" in the cell of the UE and "assigned resources" in the cell of the UE, it has been explained above how these parameters can be used in order to determine if a UE can be a high data rate UE or not. The same principles are used by the network controlling node.

The radio environment of the UE is suitably expressed as the Doppler shift and/or the delay spread and/or the angular spread in the signals from the UE to the controlling node.

In embodiments, the network controlling node is arranged to transmit to a controlling node information on which power control schemes that another controlling node in the cellular communications system is arranged to use.

In embodiments, the network controlling node is arranged to receive from a controlling node information on a power control scheme that has been chosen for use by the controlling node for a certain UE, and to transmit said information to a plurality of other controlling nodes.

In embodiments, the network controlling node is an RNC in a WCDMA system or in a CDMA 2000 system or in a TDS-CDMA system, or it is a BSC in a GSM system.

In embodiments, the network controlling node is arranged to send a recommendation for the choice of one of a number of power control schemes to the controlling node for use for a certain UE.

The invention also discloses a method for use in a controlling node for User Equipments, UEs, in a cell in a cellular communications system, and comprises generating and transmitting control commands to the UEs in said cell regarding their output power level. The method comprises generating in the controlling node said control commands using either at least a first or a second power control scheme.

In embodiments, the first power control command scheme is a signal quality based power control scheme and the second power control scheme is a signal strength based power control scheme.

The invention also discloses a method for use in a network controlling node for a cellular communications system, and comprises generating and transmitting to controlling nodes of cells in the cellular communications system one or more configuration commands for the generation of power control commands to User Equipments, UEs. The method comprises receiving from at least one controlling node information regarding different power control schemes that the controlling node is arranged to use in the generation of said power control commands, and sending a command to the controlling node regarding which of said different power control schemes that the controlling node should use for a certain UE.

BRIEF DESCRIPTION OF THE DRAWINGS

The invention will be described in more detail in the following, with reference to the appended drawings, in which.

DETAILED DESCRIPTION

Figure 1:
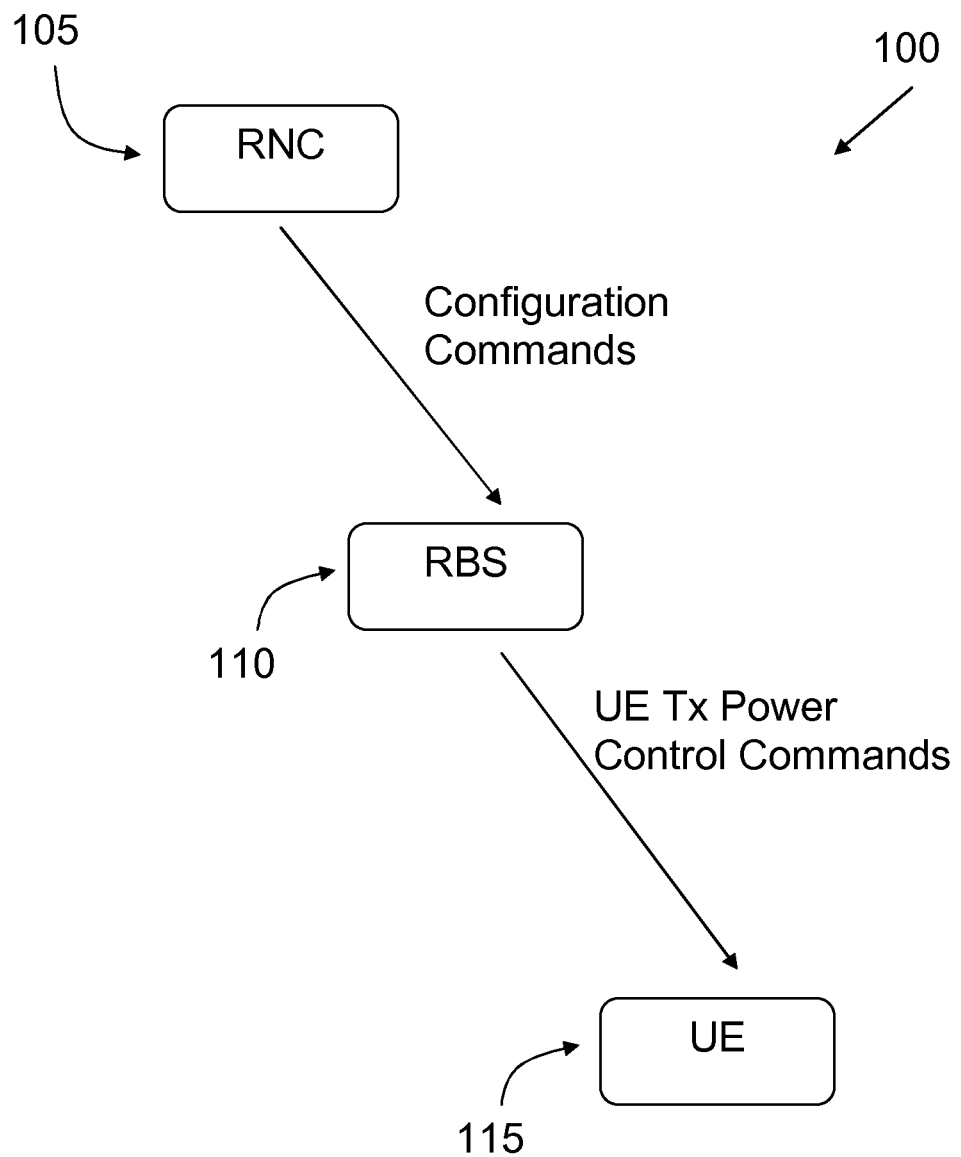
FIG. 1 shows a prior art system.

Embodiments of the present invention will be described more fully hereinafter with reference to the accompanying drawings, in which embodiments of the invention are shown. The invention may, however, be embodied in many different forms and should not be construed as being limited to the embodiments set forth herein. Like numbers in the drawings refer to like elements throughout.

The terminology used herein is for the purpose of describing particular embodiments only, and is not intended to limit the invention.

FIG. 1 shows a schematic view of a generic prior art cellular communications system 100. The cellular communications system 100 comprises at least one controlling node 110 of a cell (not shown) in the cellular communications system, here shown as an RBS, Radio Base Station, which is here used as a generic name for a controlling node of a cell. Such controlling nodes have differing names in different cellular communications system, e.g. NodeB in WCDMA systems and eNodeB in LTE systems.

All traffic to and from User Equipments, UEs, in a cell is routed through the RBS of the cell, and the RBS also performs a degree of control over the UEs in the cell. In FIG. 1, one UE 115 is shown as an example. The RBS 110 carries out control of the output power level used by the UEs in the cell, by means of generating and transmitting so called power control commands to the UEs, which is done on an "individual level", i.e. for each UE. In most systems, there are two control loops for the output power used by the UEs in a cell, the so called outer and inner loops. What is described here is the inner loop. The RBS 110 is, in turn, controlled by a so called Radio Network Controller, an RNC 105. The RNC 105 sends configuration commands to the RBS 110 for configuring the RBS's power control. In more detail, these configuration commands usually concern how the RBS 110 should generate the power control commands to the UEs 115.

An RBS of the invention is arranged to generate the power control commands to the UEs in a cell by means of either at least a first or a second power control scheme. The nature of these at least two power control schemes may of course vary within the scope of the invention, but in one embodiment, one of the power control schemes is a so called signal quality based power control scheme, and the other is a so called signal strength based power control scheme.

Briefly, a signal quality based power control scheme is one which focuses highly on the Quality of Service, QoS, of each individual UE in a cell. However, although such schemes will give a good QoS, they may sometimes result in a high degree of interference, both inter- and intra-cell interference.

In an example of a signal quality based power control scheme, the RBS, i.e. the controlling node, generates the power control commands to the UE based on the estimated or measured or derived 'signal quality' of the (uplink) received signals. Examples of signal quality are SINR measurement, SNR measurement, block error rate (BLER), frame error rate (FER), packet error rate etc. In summary, any suitable metric which can depict or reveal or indicate the quality of service (QoS) of the uplink transmission can be regarded as a 'signal quality' metric. The BLER or any type of packet or FER can be derived by the RBS using cyclic redundancy check (CRC), or from pre-defined mapping between SINR/SNR and BLER or FER.

A signal strength based power control scheme, on the other hand, is one which has as a main aim to keep a stable level of intra-cell interference. A drawback with such schemes is that the QoS of the UEs cannot be controlled to the same degree as with signal quality based power control schemes.

In an example of a signal strength based power control scheme, the RBS or the controlling node generates the power control commands to the UE based on the estimated or measured or derived 'signal strength' of the (uplink) received signals. The received signal strength from the UE can be measured on any type of reference signals or pilot signals or even on TPC commands sent by the UE for the downlink power control. These signals are sent (in UMTS) over DPCCH by the UE in the uplink. The controlling node may also use other channels, such as E-DPCCH or even data channel such as E-DPDCH for estimating the uplink received signal strength of the UE. The SINR comprises the signals received from the UE and the interference plus noise. The SNR comprises the signals received from the UE and the noise; this is useful under low interference scenario. An example of signal strength is the received power of the CDMA code channel transmitted by the UE. The signal strength may therefore also be termed as received signal code power, RSCP. More specifically, the signal strength can be measured on pilot signals or any type of reference signals or even on TPC control commands sent by the UE for the downlink power control.

Naturally, an RBS of the invention may also be arranged to use more than two different alternative power control schemes, as well as being arranged to use two different power control schemes which do not include those described above.

Figure 2:
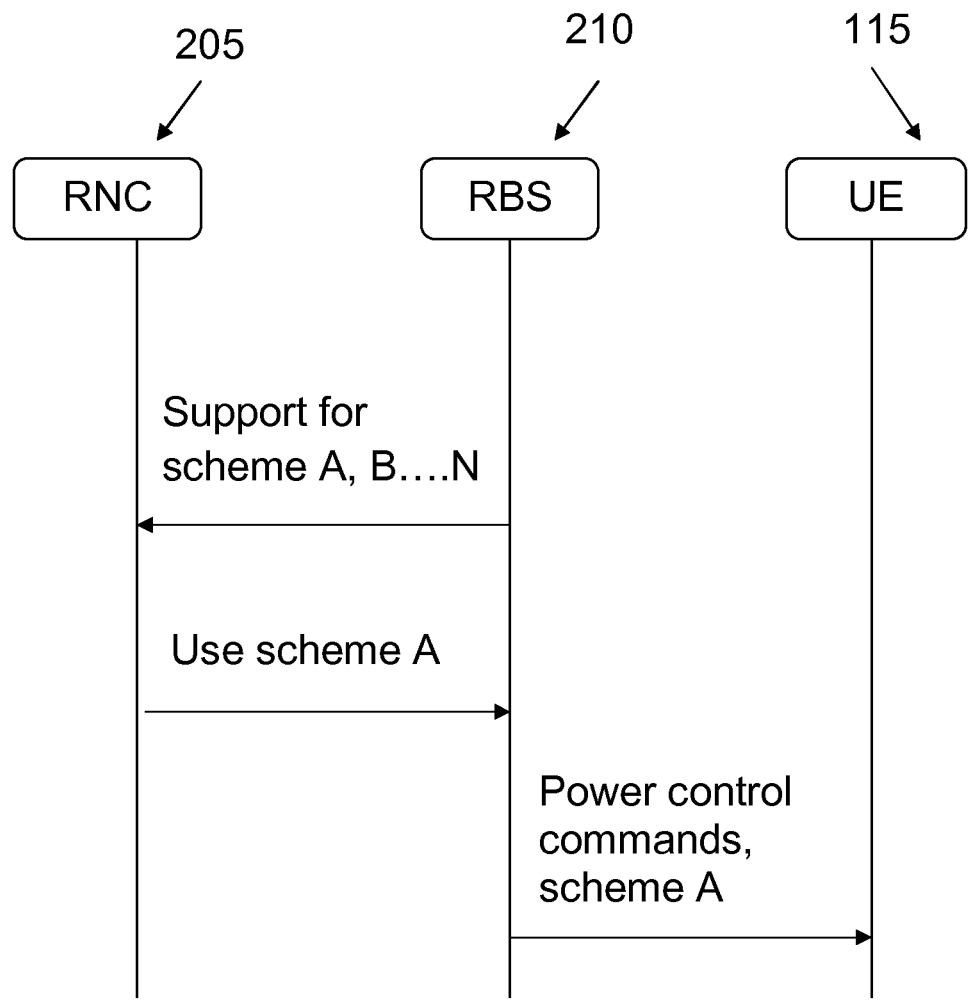
FIG. 2-7 show various embodiments of the invention.

In a further embodiment, as illustrated schematically in FIG. 2, an RBS 210 of the invention is arranged to transmit to an RNC 205 information regarding which the at least two power control schemes are that the RBS 210 is arranged to use in generating the power control commands to the UEs 115. In FIG. 2, this is shown as the RBS 210 transmitting its support for power control scheme A, B . . . N to the RNC 205. As is also shown in FIG. 2, in one embodiment, the RBS 210 is arranged to receive from the RNC 205 a command from the RNC regarding which of the power control schemes A, B . . . N that the RBS 210 should use in generating the power control commands to the UEs 115. In FIG. 2, as an example, it is power control scheme A that is chosen by the RNC 205 and which the RBS 210 is instructed by the RNC 205 to use in generating the power control commands to the UE 115.

Figure 3:
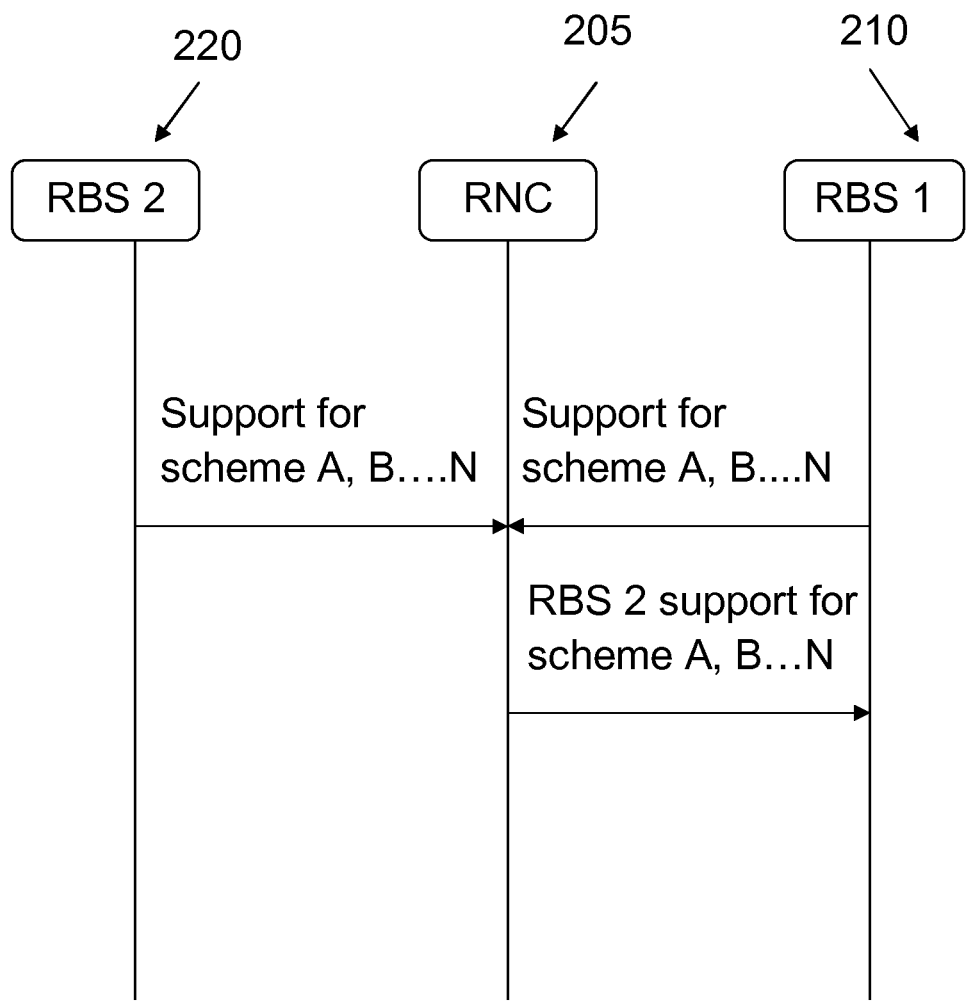

In a further embodiment, shown in FIG. 3, the RBS 210 is arranged to transmit its support for power control scheme A, B . . . N to the RNC 205, and to also receive from the RNC 205 information regarding the capabilities of at least one other RBS 220 in the cellular communications system with respect to which power control scheme or schemes (A, B . . . N) that the RBS 220 is arranged to use. As shown in FIG. 3, this information is first transmitted from the RBS 220 to the RNC 205, for "forwarding" to the RBS 210 by the RNC 205.

In a further embodiment, the RBS 210 is arranged to decide which of the power control schemes to use, i.e. to choose among the power control schemes that it is arranged to use and to choose one of them for use. In embodiments, the RBS 210 is arranged to use the information regarding the capabilities of the least one other RBS 220 in its selection of power control scheme. This can be useful in, for example, avoiding inter-cell interference.

Figure 4:
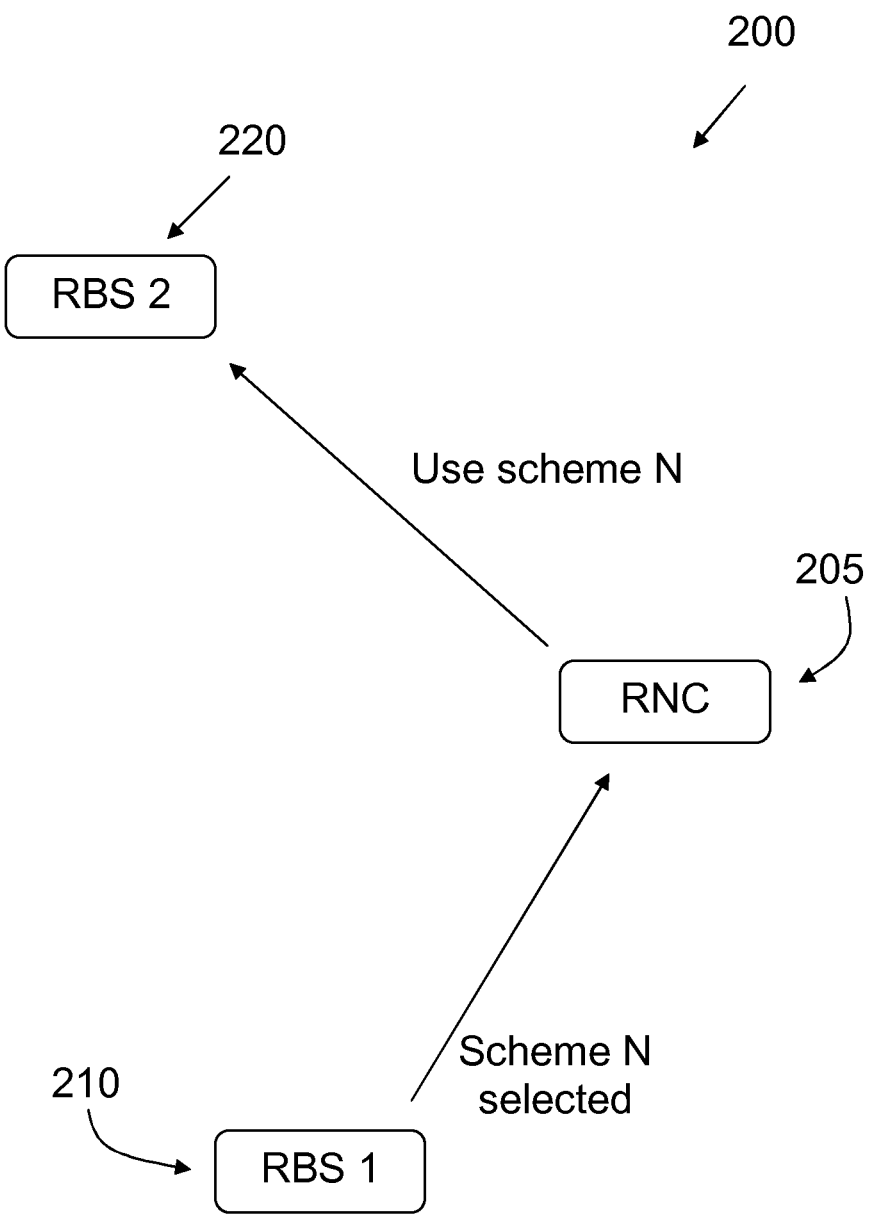
Figure 5:
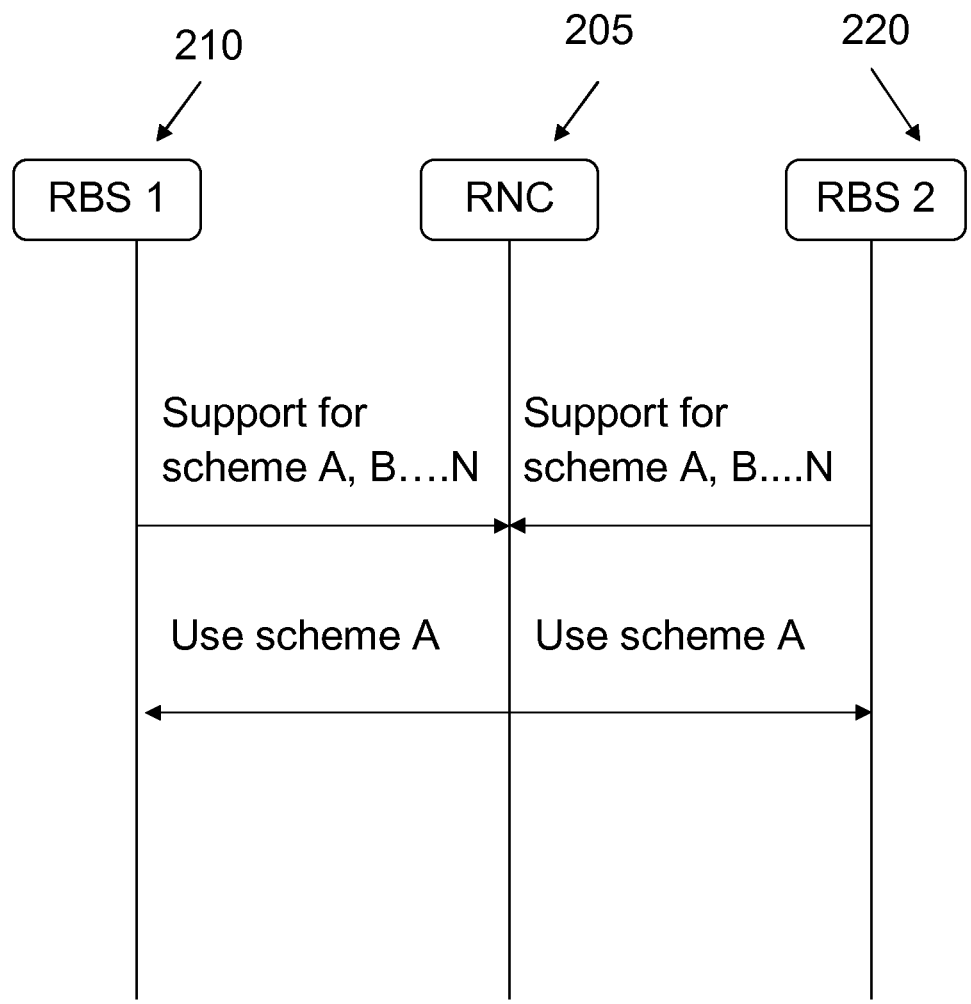
Figure 6:
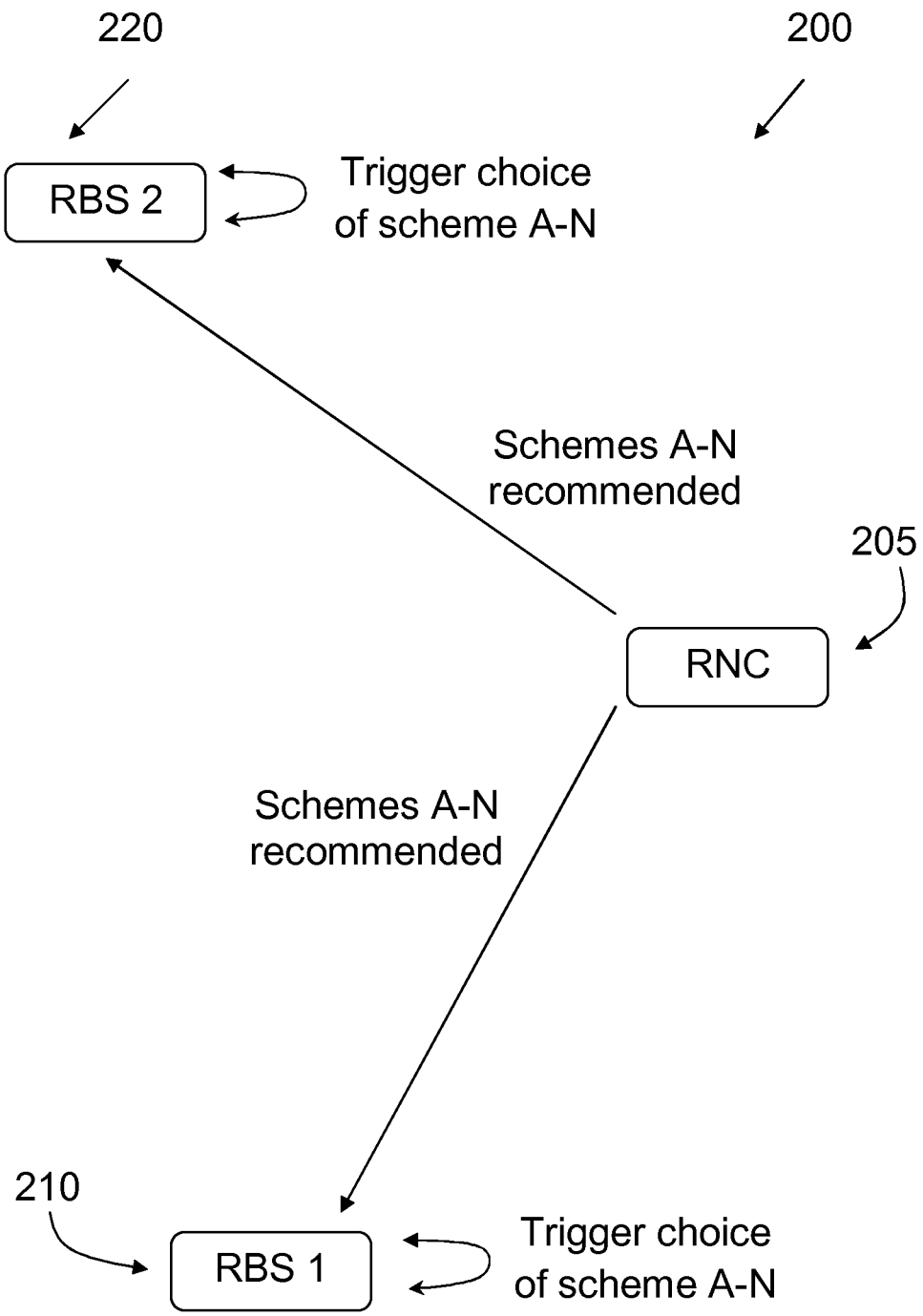
Figure 7:
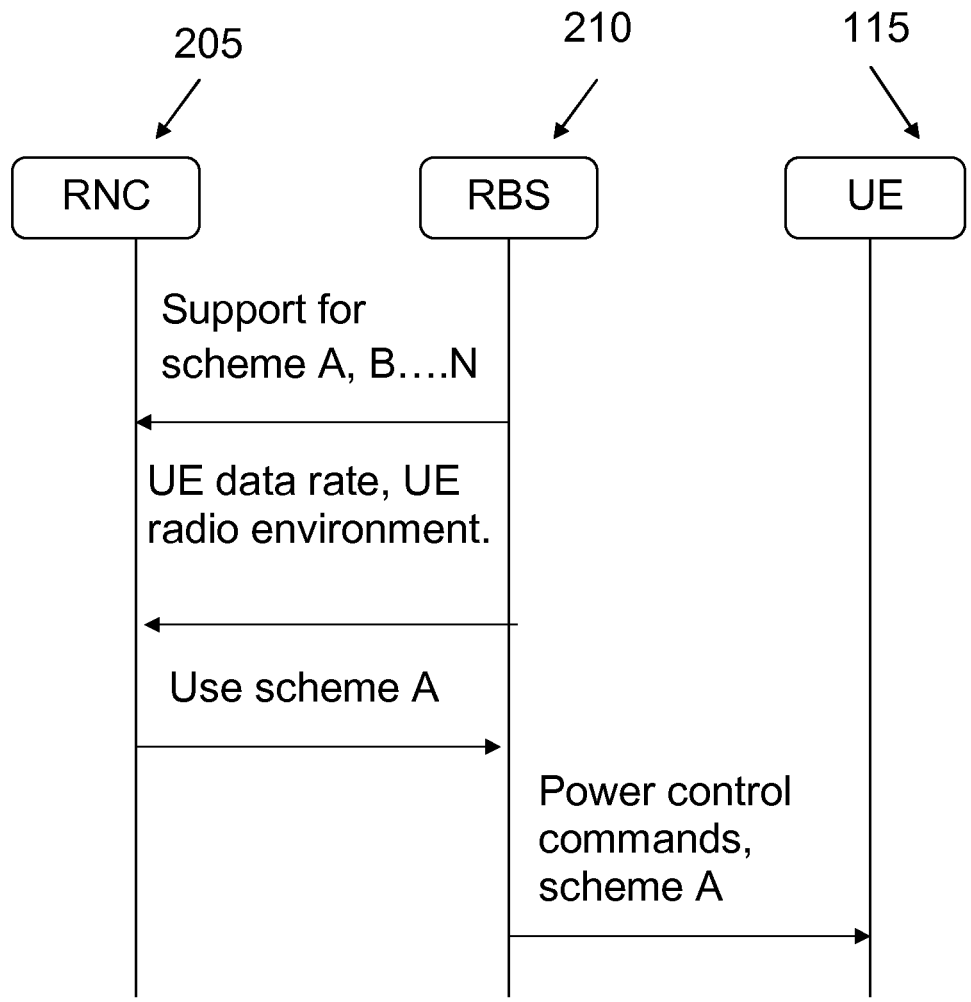

In a further embodiment, as show in FIG. 4, the RBS 210 is arranged to transmit its choice of power control scheme to the RNC 205, which, as an example, can be used by the RNC 205, if the RNC 205 has designated one of the RBSs in the system, such as the RBS 210, as "master" RBS in a part of the cellular communications system, in which case the RNC 205 merely transmits the choice of power control scheme made by the RBS 210 to the other RBSs (RBS 220 in FIG. 4 as an example) as a command for which power control scheme to use, as shown in FIG. 4.

As shown in FIG. 2 and as described in connection with that drawing, the RBS 210 is in embodiments arranged to receive a command from the RNC 205 regarding which of its power control schemes to use. In a further embodiment of this, the RBS 210 is arranged to transmit information to the RNC 205 for use in the RNC 205's selection of which of the different power control schemes that should be used by the RBS 210 for a certain UE. This information includes one or more of the following parameters in a certain cell which is controlled by the controlling node:

A target received signal level in the cell of the UE,

Assigned resources in the cell of the UE,

These two parameters will be used by the RNC 205 in the manner explained previously, in order to determine if a UE in the cell in question can be a high data rate UE or not.

The radio environment of the UE.

An example of a metric for the target received signal level in the cell of the UE is the target RoT, Rise over Thermal, in the cell of the UE, and an example of a metric for the assigned resources in the cell is the Grants or E-TFC, Enhanced Transport Compilation, in the cell. The radio environment of the UE is suitably expressed as the Doppler shift and/or the delay spread or the angular spread of the signals from the UE in question to the RBS 210

These three metrics will be mentioned again in the text below. However, they will not be exemplified again.

As mentioned previously, in embodiments the RBS 210 is arranged to decide on its own which of the power control schemes to use, i.e. to choose among the power control schemes that it is arranged to use, and to choose one of them for use. In one such embodiment, the RBS 210 is arranged to base its selection of power control scheme for a certain UE on one or more of the following parameters for the UE in question:

Call or session state, e.g. whether latency is critical or not,
QoS, exemplified as for example, target delay, BLER, etc. or e.g. type of call such as emergency or normal,
RoT variation in the cell of the UE,
Target received signal level in the cell of the UE,
Assigned resources in the cell of the UE
File size,
Uplink receiver type,
Radio environment.

How these parameters are used by the RBS 210 to choose a certain power control scheme will be explained in more detail later in this text.

In embodiments, the RBS 210 is arranged to receive a recommendation from the RNC 205 for a number of power control scheme to use, and to use this recommendation in combination with one or more of the parameters listed above in order to select which of the recommended power control schemes to use for a certain UE.

Figure 10:
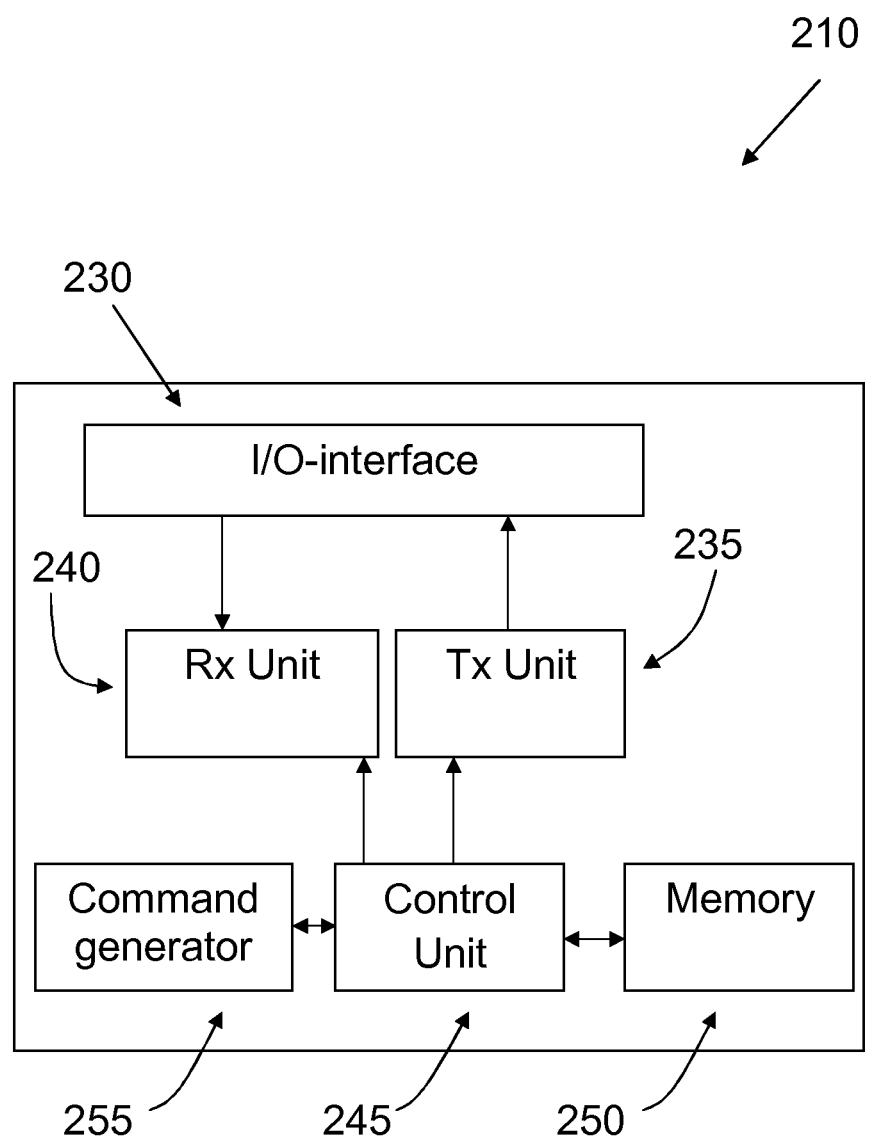
FIGS. 10 and 11 show examples of nodes of the invention.

FIG. 10 shows a basic block scheme of an embodiment of an RBS 210 of the invention: as shown in FIG. 10, the RBS 210 comprises an I/O interface 230 for interfacing with, for example, an antenna or other such external communication means. The RBS 210 also comprises a receiver unit 240 for receiving transmissions from other units in the system, such as UEs and one or more RNCs. In addition, the RBS 210 comprises a transmitter unit 235 for making transmission to other units in the system, such as UEs and one or more RNCs.

Both the receiver unit 240 and the transmitter unit 235 are controlled by a control unit 245, such as for example, a microprocessor, which uses a memory 250.

As shown in FIG. 10, the RBS 210 also comprises a command generator 255 for generating the control commands to the UEs. Suitably, though, it is the control unit 245 which chooses between the different power control schemes and thus instructs the command generator 255. This choice, as well as the generation of the control commands can also be done in a special unit for this purpose, which is then comprised in the RBS 210, or the choice can be done in the command generator 255. The details of the various power control schemes are suitably stored in the memory unit 250.

Information to and from the network controlling node, i.e. the RNC, is sent/received, respectively, by the transmitter unit 235 and the receiver unit 240, via the I/O-interface 230.

The invention also discloses an RNC for use as the RNC 205 shown in FIGS. 2-6 and described in connection to those drawings. Thus, the RNC 205 is arranged to generate and transmit to controlling nodes such as the RBS 210 one or more configuration commands for the generation of power control commands to User Equipments such as the UE 115 of FIGS. 2-6.

As shown in FIG. 2, the RNC 205 is arranged to receive from at least one RBS 210 information regarding different power control schemes that the RBS 210 is arranged to use in the generation of its power control commands, and to generate and send a command to the RBS 210 regarding which of the different power control schemes that the RBS 210 should use.

Regarding how the choice is made of which power control scheme that the RBS 210 should use for a certain UE 115, there are a number of embodiments in the invention, as will be described below. In a first embodiment, as shown in FIG. 2 and as described above, it is the RNC 205 that decides which power control scheme that the RBS 210 should use for the UE 115. Thus, it is the RNC that decides the power control scheme to be used, and which triggers the selection and switching of the inner loop power control. The RBS 210 uses the power control scheme that is selected by the RNC 205.

However, the RBS 210 can provide necessary measurements and thus supply information to the RNC 205 to assist the RNC 205 in determining a proper power control scheme. Such measurements and information includes such parameters as the data rate of the UE 115 and the radio environment of the UE 155, expressed as the Doppler shift or the delay spread or the angular spread of the signals from the UE 115.

In a further embodiment, as shown in FIG. 4 and described in connection to that drawing, the RBS 210 is arranged to take the decision on which power control scheme to use for a certain UE 115 in the cell, and to do the same for all of the UEs in a cell of which the RBS 210 is the controlling node.

Thus, in this embodiment, it is the RBS 210 which selects the power control scheme to be used for a UE, and which triggers the selection and switching of power control scheme. In order to avoid problems e.g. in soft handover if several different RBSs involved in the so called "active set" select different power control schemes, there are different versions of this embodiment, as follows:

1. Introducing a pre-defined rule which says that the RBS 210 should always choose a certain power control scheme of those available to it, for example a signal quality based power control scheme.
2. Designating one of the RBSs in a set, for example in the so called "active set" as "delegate", preferably the RBS 210 which controls the serving cell, and letting the delegate RBS select the power control scheme for all of the Node Bs involved in the soft handover. The delegate RBS sends the information related to the selected power control scheme (e.g. identifier of the scheme) to RNC 205. The RNC 205, in turn, informs the other RBSs in the set (for example those RBSs involved in soft handover) about the selected inner loop power control scheme. This is the embodiment which is also shown in FIG. 4, where RBS 1 informs the RNC 205 that it has selected power control scheme N, and the RNC 205 forwards this decision to RBS 2.

In this embodiment, in order to assist the delegate RBS in choosing power control scheme, the RNC 205 may send the power control scheme capability of all the RBSs involved in the soft handover to the delegate RBS. This is similar to what is shown in FIG. 3, in which all RBSs report their power control scheme capabilities to the RNC 205, and the RNC 205 forwards the information to one of the RBSs.

Alternatively, in this embodiment, the RNC 205 or any other suitable node (e.g. a self organizing node (SON) node or an O&M/OSS node) "pre-configures" the delegate RBS with the power control scheme capabilities of the other RBSs. In a main-remote radio system, multiple cells are controlled by one RBS, and this embodiment is possible without assistance from the RNC 205. If needed, the RNC 205 can provide necessary measurements/information to the delegate RBS 205.

In a further embodiment, both the RNC 205 and the RBS 210 are involved in determining the power control scheme. The RNC 205 transmits a recommendation for a number of power control schemes to be used to the RBS 210, based on various measurements and information, such as e.g. the RBS's capability regarding power control schemes, the UE call (or session) state, etc. of which the RNC 205 is aware.

After receiving the recommendation, the RBS 210 triggers an internal selection of power control scheme, and a possible switching of power control scheme. When selecting power control scheme, the RBS 210 uses the recommendation from the RNC 205 together with measurements and information that the RBS 210 is aware of. This embodiment has two "sub-cases":

If a signal quality based power control scheme is recommended by the RNC, the Node B will simply follow the recommendation.

If a signal strength based power control scheme is recommended by the RNC, the Node B can either directly follow the recommendation or further evaluate and determine the desired inner loop power control scheme based on available measurements and information. In order to obviate possible problems with soft handover in this embodiment, one of two options can be used:

a) A pre-defined rule that the RNC 205 will always recommend signal quality based inner loop power control to the RBS 210, regardless of the RBS's capability for different power control schemes, or b) Designating one RBS in the active set as delegate, preferably the RBS which controls the serving cell, and to let the delegate RBS receive the recommendation from the RNC and select the power control scheme for all of the RBSs involved in the soft handover. The delegate RBS sends the information about its selected power control scheme (e.g. as an identifier of the selected power control scheme) to the RNC. The RNC then informs the other RBSs involved in the soft handover about the selected power control scheme. The signaling is done on the interface between the RBS and the RNC. In order to achieve this, a new set of information elements (IEs) can, for example, be introduced. One IE can be used by the delegate RBS to inform the RNC about the selected power control scheme. Another IE can be used by the RNC for indicating to the other RBSs the selected power control scheme. In an HSPA enabled system, the IEs will be signaled over the Iub interface (i.e. between the RNC and the RBS). However, in a HSPA system, in some cases, the signaling may also be sent over Iur interface (i.e. between RNCs). This may, for example, occur when all of the RBSs involved in the soft handover are not under the control of the same RNC. Consider the case where the RBS 210 which controls the serving cell is under the control of the RNC 205 and the other RBSs are under the control of another RNC, "RNC 2". Then, in this example the RBS 210 first sends the IE to the RNC 205 over the Iub interface. Then the RNC 205 forwards the IE to RNC 2, which in turn sends the received IE (information) to the other RBSs.

In the description of the embodiment of the RBS 210 shown in FIG. 2, i.e. the embodiment in which the RBS 210 "independently" chooses power control scheme, a number of parameters were listed on which the RBS 210 may base its choice of power control scheme. With the inclusion of the The same parameters can be used by the RNC 205 in the embodiments in which the RNC 205 chooses or is arranged to choose (or recommend) a power control scheme to one or more RBSs for use by a certain UE, with the inclusion of the power control command schemes of the RBS in question.

The parameters in question were as follows for a certain UE:

Call or session state, e.g. whether latency is critical or not,
QoS, exemplified as target delay, BLER, etc. or e.g. type of call such as emergency or normal,
RoT variation in the cell of the UE,
Target received signal level in the cell of the UE,
Assigned resources in the cell of the UE.
File size,
Uplink receiver type,
Radio environment characteristics of the UE.

Below, a description will be given regarding how these parameters can be used by a node (the term "node" is used here as a generic term since either the RBS and or the RNC can be the node in which the choice of power control scheme is made. However, regardless of node, the principles for use of the parameters are the same.) for choice of power control scheme. In the examples below, it will be assumed that the power control schemes between which the node can choose are a first power control scheme which is a signal quality based power control scheme and a second power control scheme which is a signal strength based power control scheme.

Criteria for choosing signal quality based power control:

When a cell or a radio link controlled by an RBS which does not support a signal strength based inner loop power control has been added, or is being added, or is going to be added to the active set, or During call or session setup, up where low latency is crucial, or Running a service/session with tight QoS requirement or involving time criticality aspect such as in case of emergency call, or The variation in cell RoT is small, for example if the variation is below 5 dB, or The data rate of the UE is low. This can be determined by the node which selects the power control scheme as follows:
  target received signal level, such as, for example, target RoT in the cell of the UE, is medium or low, and/or
  Low assigned resources, e.g. no large grants are issued or no large set of resources are allocated or no high E-TFC is detected, and/or
  By inspecting the headers of the higher layer packets using cross layer communication e.g. reading headers of the application layer packets, and/or
  Explicit indication from another node (e.g. core network node) which is aware of the data rate requirement of the user.

Or

The file size of a high data rate UE is small (so that the UE will finish its transmissions in a short time, for example 0.5 s, or a UE can be considered "not a high data rate UE" if the data rate is, for example, below 1 Mbps), or, The UE radio environment characteristics are stable, which can be determined by the RBS, for example by means of:
  detecting small variations in the measured Doppler shift or the delay spread or angular spread over a certain time window, uplink receivers or interference cancellation receivers that can stabilize perceived interference are installed in all the Node Bs or base stations that control the cells in the active set (or at least the Node B or the BS that controls the best serving cell in the active set). The interference can be stabilized by cancelling the interference to certain extent.

Criteria for Signal strength based inner loop power control:

An RBS that supports signal strength based power control, and

During a call or a session or during a phase of any call or session where latency is not crucial, and During a service/session without tight QoS requirement or which does not have stringent delay requirement, and Variation in cell RoT is large, for example above 5 dB, and The data rate of the UE is high, i.e. above a certain predetermined threshold, such as, for example 1 Mbps. This can be determined by the network node, which selects the power control scheme as follows:

Cell target received signal level, such as target RoT, is high, and/or

Large assigned resources, e.g. large grants are issued or high E-TFC is detected on E-DPCCH, By inspecting the headers of the higher layer packets using cross layer communication e.g. reading headers of the application layer packets, Explicit indication from another node (e.g. core network node) which is aware of the data rate requirement of the user.

And

The file size of high data rate UEs is not small (so that the UE will not finish its transmissions in a short time, for example 0.5 s), and (optionally)

The UE radio environment characteristics are varied, which can be known by:

The variations in the Doppler shift or angular delay spread as measured by the RBS over a certain time window in the signals from the UE in question to the RBS are not "sufficiently" small, or Advanced uplink receiver(s) that can stabilize perceived interference are not installed in all the RBSs that control the cells in the active set (or is not installed at the RBS that controls the best serving cell in the active set).

Note that the selection and switching of inner loop power control is performed per UE, and can be based on either a subset of or all the proposed criteria.

Regarding the RNC 205 shown in the drawings and described above, the RNC is in embodiments an RNC for a WCDMA system or for a CDMA 2000 system or a TDS-CDMA system, or a BSC (Base Station Controller) in a GSM system.

The RBS 210 (as well as the RBS 220) shown in the drawings and described above is in embodiments a NodeB in a WCDMA system or an eNodeB in an LTE system or an RBS in a GSM system.

A number of parameters have been listed above as being used by the RBS and/or the RBS in the decision of which power control scheme to use for a certain UE. Below, a description will be given of how these parameters are obtained by the RBS and/or the RNC.

The RBS's power control command schemes: known by the RBS, and communicated by the RBS to the RNC, as explained above.

Call or session state, e.g. whether latency is critical or not: The RNC knows the call or session state (whether during call/session setup or not) since the RNC is involved in the call/session configuration. The Node B can determine this parameter by different mechanisms:

a) By sniffing the higher layer packets; more specifically by checking the corresponding call/service characteristics by inspecting the headers of the packets (e.g. headers of application packet or type of packets). The sniffing of higher layer packet is done based on the well known mechanism of the cross layer communication.

b) By comparing the issued grant with the actual adopted E-TFC detected on E-DPCCH. The call/session is finished and the real transmission starts if the actual E-TFC gets close to the issued grant.

QoS attributes/requirements are known by both the RNC and the Node B.

RoT variation in the cell of the UE: available at the RBS by means of measurements, and available at the RNC via measurement reports from the RBS.

If the UE is a high data rate user, based on the cell target received signal level, e.g. Target RoT and Grant (or E-TFC): available at the RBS, and available at the RNC via measurement reports from the RBS.

File size: not known by the RBS or the RNC, but they can determine the file size by reading the headers of the higher layer packets via cross layer communication, since the headers of the application level packet typically include the file type/size information.

Uplink receiver type: inherently known by the RBS, and the RNC can implicitly determine the uplink receiver type by e.g. analyzing the variation in the reported RoT measurements or any other measurements (e.g. UL BLER reported by the RBS reported by the RBS to the RNC. The RNC can also determine the receiver type by observing the performance of radio link control (RLC) protocol e.g. RLC retransmission rate or BLER etc. For example, the RNC can compare the RLC performance with a reference case which is based on a baseline receiver.

Radio environment characteristics: The Doppler shift and the angular delay spread in the signals from a UE to "its" RBS. These measurements are performed by, and therefore known by, the RBS. The delay spread such as expressed in term of the mean or RMS value or any other suitable statistical measure of the signals received at the RBS can be determined by the RBS receiver.

Figure 11:
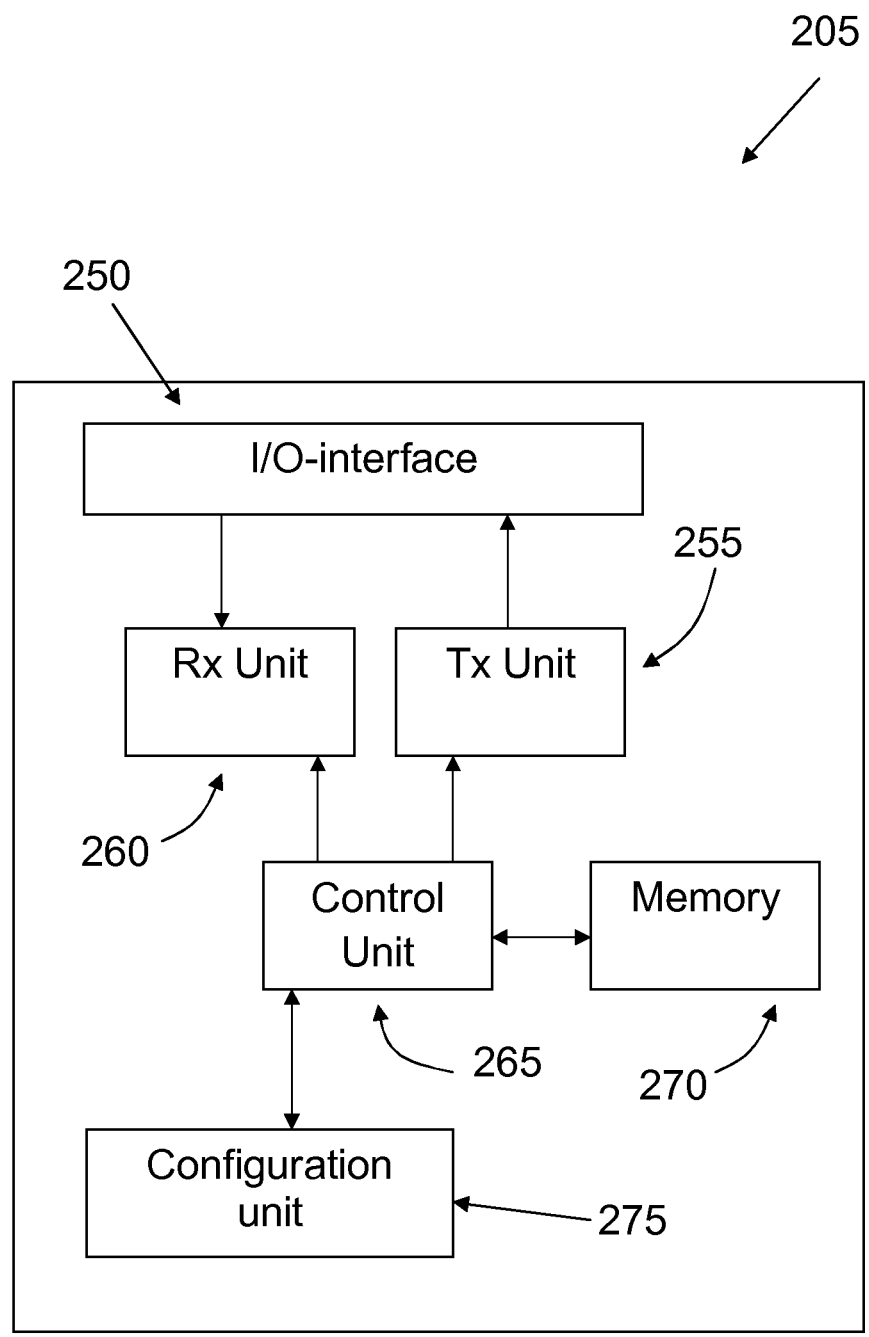

FIG. 11 shows a basic block diagram of an embodiment of an RNC 205 of the invention: as shown in FIG. 11, the RNC 205 comprises an I/O interface 250 for interfacing with, for example, an antenna or other such external communication means. The RNC 205 also comprises a receiver unit 260 for receiving transmissions from other units in the system, such as one or more RBSs. In addition, the RNC 205 comprises a transmitter unit 255 for making transmission to other units in the system, such as one or more RBSs and "higher level" nodes in the system.

Both the receiver unit 260 and the transmitter unit 255 are controlled by a control unit 265, such as for example, a microprocessor, which uses a memory 270.

As shown in FIG. 11, the RNC 205 also comprises a configuration unit 275 for generating configuration commands to the RBSs. Suitably, it is the configuration unit 275 which is also responsible for generating the commands to an RBS regarding which power control scheme that the RBS should use, although this can in embodiments also be performed by the control unit 265 or by a separate unit in the RNC 205. The configuration commands, as well as, where applicable, commands regarding which power control command to use which are sent to an RNS are sent by means of the transmitter unit 255 via the I/O-interface 250. The information regarding an RBS's different power control commands are received by the receiver unit 260 via the I/O-interface 250, and suitably stored in the memory unit 270.

In general, information to and from the RBSs, is carried out by the transmitter unit 255 and the receiver unit 260, via the I/O-interface 250.

Figure 8:
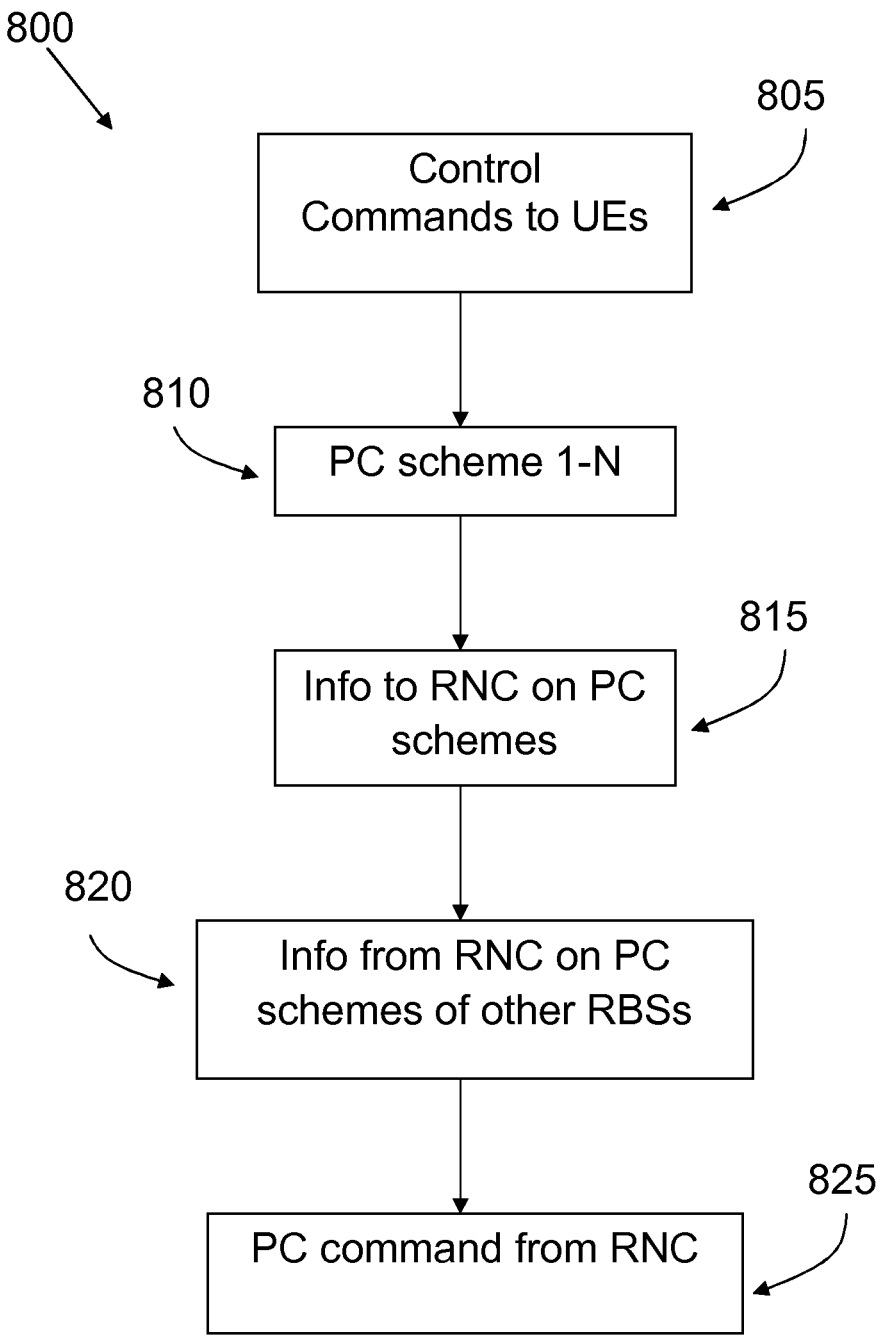
FIGS. 8 and 9 show flow charts of methods of the invention.

FIG. 8 shows a flow chart of a method 800 for use in a controlling node, such as the RBS 210, for User Equipments, UEs, in a cell in a cellular communications system. As shown in step 805, the method 800 comprises generating and transmitting control commands to the UEs in the cell regarding their output power level. The method 800 comprises, as shown in step 810, generating in the controlling node 210 the control commands using either at least a first or a second power control scheme, generically one of N schemes, i.e. scheme 1-N.

As shown in step 815, the method 800 in embodiments comprises transmitting to a network controlling node such as the RNC 205 information regarding which the power control schemes are that the method 800 comprises the use of.

As shown in step 820, in embodiments the method 800 comprises receiving in the controlling node from the RNC 205 information regarding the capabilities of at least one other RBS 220 in the cellular communications system with respect to which power control scheme or schemes that the other RBS 220 is arranged to use.

As shown in step 825, in embodiments the method 800 comprises receiving a command in the RBS 210 from the RNC 205 regarding which of said power control schemes that should be used in generating said control commands to a certain UE.

In embodiments, the method 800 comprises transmitting information from the RBS 210 to the RNC 205 for use in the RNC's selection of which of the at least two different power control schemes that should be used by the RBS 210 for a certain UE, the information including one or more of the following parameters in a certain cell which is controlled by the controlling node:
  Target received signal level in the cell,
  Assigned resources in the cell,
  These two parameters will be used as explained above, in order to determine if a UE in the cell in question can be a high data rate UE or not.
  The radio environment characteristics of the UE in question, for example expressed as the Doppler shift or the angular delay spread in the signals from the UE to "its" RBS.

In embodiments, the method 800 comprises deciding in the RBS 210 which of said power control schemes to use for a certain UE, and transmitting information on this decision to the RNC 205.

In embodiments, the method 800 comprises using the information regarding the capabilities of the least one other controlling node 220 in the selection of power control scheme for a certain UE.

Figure 9:
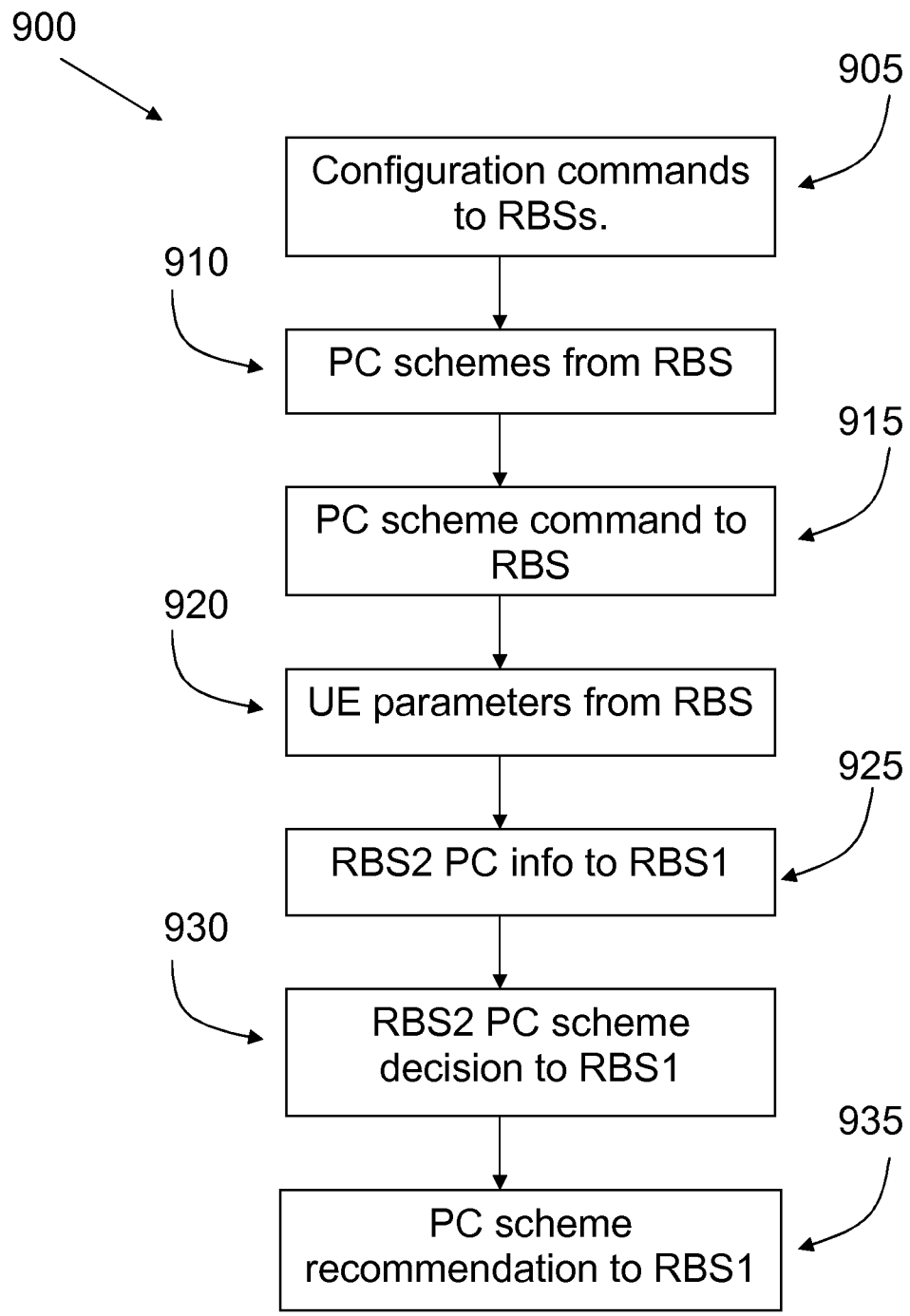

FIG. 9 shows a schematic flow chart of a method 900 for use in a network controlling node such as the RNC 205 for a cellular communications system. The method 900 comprises, as shown in step 905, generating and transmitting to controlling nodes, such as the RBS 210, of cells in the cellular communications system one or more configuration commands for the generation of power control commands to User Equipments, UEs.

The method 900 comprises receiving from at least one RBS 210 information regarding different power control schemes that the RBS 210 is arranged to use in the generation of the power control commands, and sending, step 915, a command to the controlling node regarding which of said different power control schemes that the controlling node should use for a certain UE.

In embodiments, the method 900 comprises receiving, as shown in step 920, a number of parameters from an RBS, the parameters being one or more of the following parameters in a certain cell which is controlled by the controlling node:
  Target received signal level in the cell,
  Assigned resources in the cell,
  These two parameters will be used as explained above, in order to determine if a UE in the cell in question can be a high data rate UE or not.
  The radio environment characteristics of a UE.

In embodiments, the method 900 comprises basing the command to the controlling node for a certain UE on one or more of the following:
  The controlling node's power control command schemes,
  Call or session state, e.g. whether latency is critical or not,
  QoS, exemplified by target delay, BLER, etc. or e.g. type of call such as emergency or normal,
  RoT variation in the cell of the UE,
  If the UE is a high data rate UE, based on:
    Target received signal level in the cell
    Assigned resources in the cell
  File size,
  Uplink receiver type,
  Radio environment characteristics of the UE in question.

In embodiments, the method 900 comprises, step 925, transmitting to an RBS 210 information on which power control schemes that another RBS in the cellular communications system is arranged to use.

In embodiments, the method 900 comprises, step 930, receiving from an RBS 210 information on a power control scheme that has been chosen for use by the RBS 210 for a certain UE, and transmitting this information to a plurality of other RBSs.

In embodiments, the method 900 comprises identifying to an RBS 210 a number of power control schemes, and to also send, step 935, a recommendation for the choice of one of these power control schemes for a certain UE to the RBS 210.

The controlling node, i.e. the RBS 210 (as well as the RBS 220) shown in the drawings and described above is in embodiments a NodeB in a WCDMA system or an eNodeB in an LTE system or an RBS in a GSM system.

The controlling node may also be a relay node. Furthermore the relay node may be a fixed relay or a mobile relay or a wireless device acting as a relay.

The WCDMA, HSPA, CDMA2000 1x, High Rate Packet Data (HRPD) are well known examples of CDMA based cellular communications systems. The invention is applicable to all these systems. Multi-carrier (MC) or carrier aggregation (CA) or multi-cell transmission schemes may also be employed in CDMA based systems. In MC or CA systems the UE receive and/or transmit data/control using more carriers simultaneously. DC-HSDPA, DB-DC-HSDPA, DC-HSUPA, 4C-HSDPA, 8C-HSDPA, MC-HSPA etc are few examples of multi-carrier variants used in HSPA.

Similarly multi-carrier CDMA2000 1x and HRPD systems also exists. The MC or CA system may also be multi-RAT system i.e. CA comprising of the HSPA and LTE carriers. The invention is applicable to all the multi-carrier systems mentioned above or to similar systems.

Another type of technology being currently specified for HSPA is called multi-point transmission or coordination multi-point transmission and reception (CoMP). This mechanism allows the UE to receive and/or transmit from/to multiple base stations or cells or locations. The embodiments of the invention also apply to the UE and controlling nodes utilizing this feature.

The invention may also applied to multi-standard radio (MSR) node. A multi-standard radio (MSR) node, which may be MSR BS or MSR relay etc, contains common radio frequency (RF) components (e.g. common power amplifiers, RF filters etc) which can be used to operate more than one RAT or more than one carrier within the same RAT. More specifically, the MSR BS is also termed as multi-carrier multi-standard radio (MC-MSR) BS due to the fact that it may comprise of single RAT with more than one carrier. Examples of RATs used in one type of MSR BS are WCDMA, GSM and LTE FDD or LTE TDD and UTRA TDD in another type of MSR BS. The carriers within the MSR node may be adjacent or non-adjacent.

The invention is also applicable to multi-carrier (MC) or carrier aggregation (CA) systems. In MC system the power control runs independently on each component carrier (CC) or cell. Thus in multi-carrier system the method may be applied on each CC independently since different criteria may be met on different CCs. For example signal strength based inner loop power control may operate on one CC and signal quality based inner loop power control one another CC or the same inner loop power control may operate on both CCs. Yet another possibility is that the inner loop power control on all CCs is chosen based on the primary or anchor carrier or based on any reference carrier. The inner loop power control scheme in turn for the primary or reference carrier is determined by the methods described in this invention disclosure.

In WCDMA/HSPA the Node B is the logical node representing a radio base station. The Node B is controlled and configured by a RNC. The RNC may also configure certain parameters associated with the power control e.g. quality target for inner loop power control etc. In other systems like CDMA 2000 1x or HRPD, the base station is also called by a base station controller analogous to RNC in WCDMA/HSPA.

Embodiments of the invention are described with reference to the drawings, such as block diagrams and/or flowcharts. It is understood that several blocks of the block diagrams and/or flowchart illustrations, and combinations of blocks in the block diagrams and/or flowchart illustrations, can be implemented by computer program instructions. Such computer program instructions may be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

In some implementations, the functions or steps noted in the blocks may occur out of the order noted in the operational illustrations. For example, two blocks shown in succession may in fact be executed substantially concurrently or the blocks may sometimes be executed in the reverse order, depending upon the functionality/acts involved.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation.

The invention is not limited to the examples of embodiments described above and shown in the drawings, but may be freely varied within the scope of the appended claims.

The invention claimed is:

1. A controlling node for User Equipments (UEs) in a cell in a cellular communications system, wherein the controlling node is arranged to:
    generate and transmit control commands to the UEs in said cell to control their output power levels;
    generate said control commands using, selectively, one of at least a first and a second power control scheme, where the first power control scheme is a signal quality based power control scheme and the second power control scheme is a signal strength based power control scheme;
    receive a command from the network controlling node, the command regarding which of said power control schemes the controlling node should use in generating said control commands to a particular UE
    receive, from a network controlling node, an identifier of the power control schemes that the other controlling node is deploying; and
    determine at least one of the first and second power control schemes
    transmit information to said network controlling node for use in the network controlling node's selection of which of said power control schemes should be used by the controlling node for a particular UE, the information including one or more of:
        a target received signal level in the cell of the UE;
        assigned resources in the cell of the UE; and
        characteristics of the radio environment for the UE in question.

2. The controlling node of claim 1, wherein the controlling node is further arranged to transmit, to said network controlling node, information regarding which power control schemes that the controlling node is arranged to use.

3. The controlling node of claim 1, wherein the controlling node is further arranged to decide which of said power control schemes to use for a particular UE, and to transmit information on its decision to the network controlling node.

4. The controlling node of claim 1, wherein the controlling node is further arranged to base its decision of power control scheme for a certain UE in said cell on one or more of the following parameters for the UE in question:
- a call or session state;
- a Quality of Service (QoS);
- an Rise over Thermal (RoT) variation in the cell of the UE;
- an a target received signal level in the cell of the UE;
- assigned resources in the cell of the UE;
- a packet or data block or file size;
- an uplink receiver type; and
- radio environment characteristics.

5. The controlling node of claim 4, wherein the controlling node is further arranged to receive a recommendation from the network controlling node for a number of power control scheme to use, and to use said recommendation in combination with said parameters to select which of said recommended power control schemes to use for a particular UE.

6. The controlling node of claim 1, wherein the controlling node is a NodeB for use in a wide-band Code-Division Multiple Access (WCDMA) system or an eNodeB for use in an Long-Term Evolution (LTE) system.

7. A method for use in a controlling node for User Equipments (U Es) in a cell in a cellular communications system, the method comprising:
- generating and transmitting control commands to the UEs in said cell regarding their output power level, wherein said control commands are generated, selectively, according to one of at least a first and a second power control scheme, wherein the first power control command scheme is a signal quality based power control scheme and the second power control scheme is a signal strength based power control scheme;
- receiving, from a network controlling node, an identifier of the power control schemes that the other controlling node is deploying;
- receiving a command in the controlling node from the network controlling node, the command regarding which of said power control schemes should be used in generating said control commands to a particular UE;
- determining at least one of the first and second power control scheme for a particular UE by the controlling node; and
- transmitting information from the controlling node to said network controlling node for use in the network controlling node's selection of which of said at least two different power control schemes should be used by the controlling node for a certain UE, said information including one or more of:
- a target received signal level in the cell of the UE;
- assigned resources in the cell of the UE; and
- radio environment characteristics for the UE.

8. The method of claim 7, further comprising transmitting, to a network controlling node, information regarding which power control schemes that the controlling node is arranged to use.

9. The method of claim 7, further comprising deciding, in the controlling node, which of said power control schemes to use for a particular UE, and transmitting information on this decision to the network controlling node.

10. A controlling node for User Equipments (UEs) in a cell in a cellular communications system, wherein the controlling node is arranged to:
- generate and transmit control commands to the UEs in said cell to control their output power levels;
- generate said control commands using, selectively, one of at least a first and a second power control scheme, where the first power control scheme is a signal quality based power control scheme and the second power control scheme is a signal strength based power control scheme;
- receive, from a network controlling node, an identifier of the power control schemes that the other controlling node is deploying;
- receive a command in the controlling node from the network controlling node, the command regarding which of said power control schemes should be used in generating said control commands to a particular UE;
- determine at least one of the first and second power control schemes, wherein the controlling node is further arranged to receive a recommendation from the network controlling node for a number of power control scheme to use, and to use said recommendation in combination with one or more parameters to determine which of said recommended power control schemes to use for a particular UE; and
- transmit information from the controlling node to said network controlling node for use in the network controlling node's selection of which of said at least two different power control schemes should be used by the controlling node for a certain UE, said information including one or more of:
- a target received signal level in the cell of the UE;
- assigned resources in the cell of the UE; and
- radio environment characteristics for the UE.

* * * * *